United States Patent [19]

Madsen et al.

[11] Patent Number: 5,309,076
[45] Date of Patent: May 3, 1994

[54] DRIVE AND CONTROL CIRCUIT FOR A BRUSHLESS DC MOTOR

[75] Inventors: Elmer W. Madsen, Bristol; Phep X. Nguyen, Windsor Locks, both of Conn.

[73] Assignee: Nidec Corporation, Torrington, Conn.

[21] Appl. No.: 892,192

[22] Filed: Jun. 2, 1992

[51] Int. Cl.⁵ .............................................. H02P 1/26
[52] U.S. Cl. .................................. 318/782; 318/254; 361/33
[58] Field of Search ..................... 361/30, 33, 56, 79, 361/86, 88, 90, 91; 318/254, 138, 139, 439, 767, 781, 782

[56] References Cited

U.S. PATENT DOCUMENTS

| | | | |
|---|---|---|---|
| 4,679,112 | 7/1987 | Craig | 361/33 |
| 4,894,745 | 1/1990 | Akagawa et al. | 361/33 |
| 5,091,818 | 2/1992 | Morikawa et al. | 361/56 |
| 5,107,387 | 4/1992 | Orton | 361/33 |
| 5,132,866 | 7/1992 | Raciti et al. | 361/56 |
| 5,157,571 | 10/1992 | Gotz | 361/56 |
| 5,157,574 | 10/1992 | Tuusa | 361/91 |

*Primary Examiner*—William M. Shoop, Jr.
*Assistant Examiner*—John W. Cabeca
*Attorney, Agent, or Firm*—McCormick, Paulding & Huber

[57] ABSTRACT

The present invention provides a drive and control circuit for a single phase, brushless DC motor. The drive and control circuit includes an integrated circuit having a maximum rated voltage lower than the maximum net voltage of the overall circuit. Internal transistors in the integrated circuit are used to drive the emitters of two external power transistors which are connected to the windings of the DC motor. In this manner, a relatively inexpensive integrated circuit can be used to drive and control a DC motor having a much higher operating voltage.

7 Claims, 1 Drawing Sheet

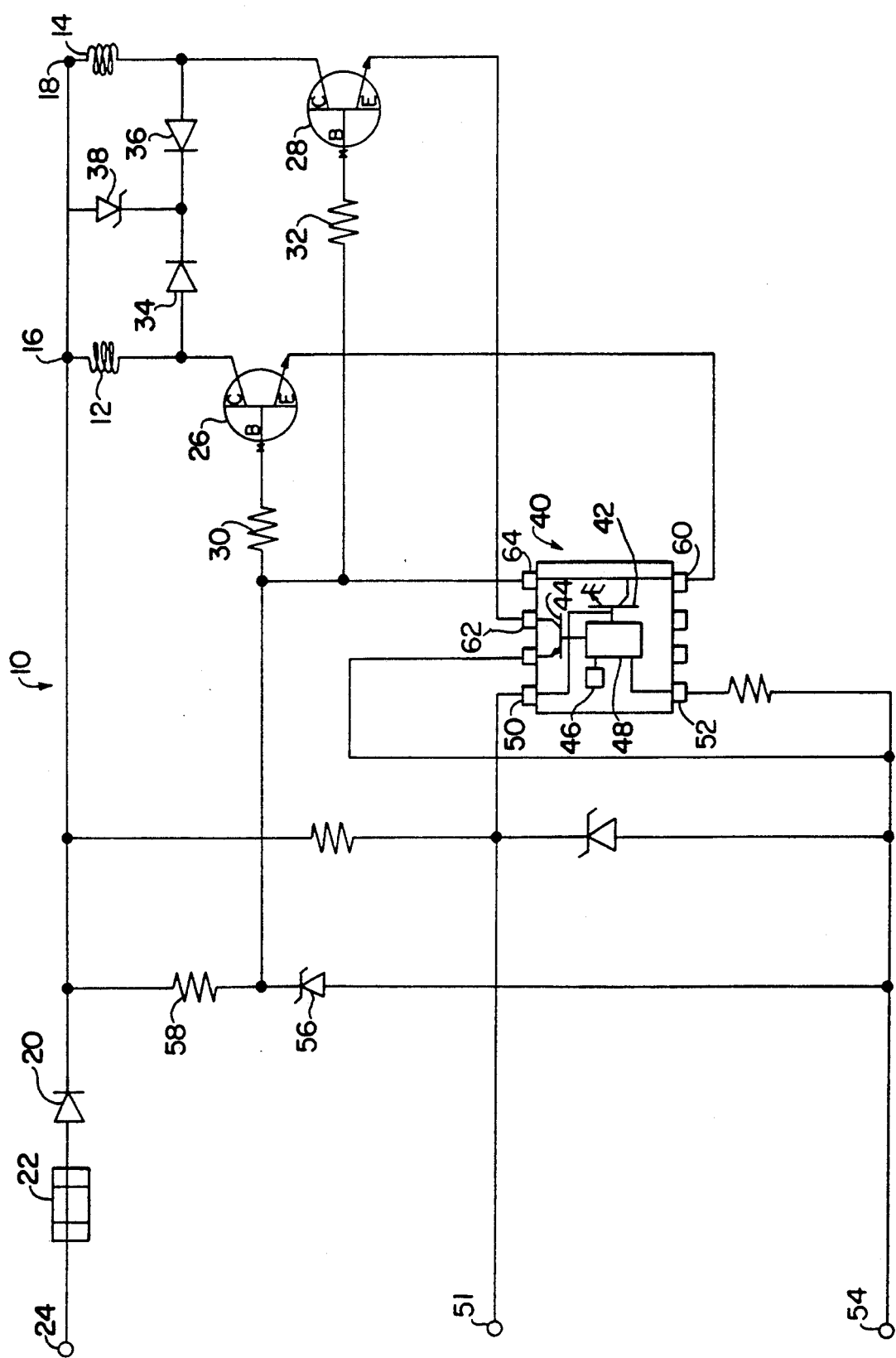

DRIVE AND CONTROL CIRCUIT FOR A BRUSHLESS DC MOTOR

BACKGROUND OF THE INVENTION

The present invention relates to brushless DC motors and, more particularly, to a drive and control circuit for single phase brushless DC motors.

Single phase brushless DC motors are commonly employed as drive motors for compact fans. Such fans are used, for example, to ventilate data processing and other electronic equipment. Operating voltages for these fans typically range from about 12 volts to over 60 volts. Unfortunately, as the operating voltage of the fan increases, the cost of the motor and its associated drive and control components causes the overall cost of the fan to exceed its selling price. This is particularly the case with fans having motors designed to operate at or near 60 volts.

Accordingly, it is an object of the present invention to provide a drive and control circuit for a brushless DC motor which not only permits the motor to operate over a broad voltage range but also reduces the overall cost of DC fans and other components incorporating such motors.

It is a further object of the invention to provide such a drive and control circuit which also provides the motor with required features such as speed control, pulse output, current limit and thermal protection.

SUMMARY OF THE INVENTION

The present invention meets these and other objects by providing a drive and control circuit for a single phase, brushless DC motor which includes an integrated circuit (IC) having a rated voltage which is less than the maximum net voltage of the drive and control circuit. The IC is of a type well-known to those skilled in the art and includes, for example, a Hall sensor together with control and commutation logic. When coupled with appropriate external logic and components, the IC further provides a number of required features such as speed control, pulse output, current limit and thermal protection.

The IC has two internal switching transistors each having a collector to emitter current flow path which is connected in series at a respective current drive output of the IC with a respective collector to emitter current flow path of an external power transistor by means of connecting the collector of each of the switching transistors to the respective emitter of the external power transistors. Each of the power transistors is, in turn, connected from its collector to a respectively distinct one of the DC motor's two stator windings. The power supply for the drive and control circuit forward biases the two power transistors at or below an IC rated voltage and also provides a supply voltage terminal for the IC with the IC rated voltage. When one of the IC's internal transistors is switched on by means of a conventional Hall sensor and logic circuitry included in the IC, a path to ground via the collector and the emitter of the switching transistor is established so that current flows through a corresponding conductively biased power transistor so that an associated stator winding is excited. Because the bias voltage to each of the power transistors is at or below the IC rated voltage, the voltage potential at the emitters of each of the power transistors and the corresponding drive outputs of the IC will be held at or below the IC rated voltage for safe operation.

In this manner, a low voltage, relatively inexpensive IC can be used to drive and control a DC motor having a much higher operating voltage. Preferably, the drive and control circuit provides the motor with an operating voltage of from about 12 to about 60 volts.

BRIEF DESCRIPTION OF THE DRAWING

FIG. 1 is a schematic circuit diagram illustrating a drive and control circuit according to the invention.

DETAILED DESCRIPTION OF THE INVENTION

The circuit diagram illustrated in FIG. 1 shows a drive and control circuit for a single phase, brushless DC motor 10 having stator windings 12 and 14 and a permanent magnet rotor (not shown). The motor is designed to operate from about 12 volts to at least 60 volts, and the terminal ends 16 and 18 of the windings are connected by diode 20 and fuse 22 to the positive pole 24 of a DC voltage source which supplies the required voltage for proper DC motor operation.

As can be seen in FIG. 1, the stator windings 12 and 14 are respectively connected to the collector of a first power transistor 26 and a second power transistor 28. The base of the first power transistor 26 is connected to the positive pole of the power supply via the electrical path through resistor 30, resistor 58, diode 20 and fuse 22. A zener diode 56 is provided in combination with the resistor 58 in order to bias the power transistor 26 via resistor 30 at a relatively low voltage when compared with a possible potential as high as 60 volts at the positive pole 24. The base of the second power transistor 28 is connected to the power supply via the electrical path through resistor 32, resistor 58, diode 20 and fuse 22. The zener diode 56 in combination with the resistor 58 also biases the power transistor 28 via resistor 32 at a similar voltage as that of power transistor 26. As those skilled in the art will recognize, by alternately and periodically activating the power transistors, magnetic fields are generated in the stator windings which cause the permanently magnetized rotor of the motor 10 to rotate. Diodes 34, 36 and zener diode 38 are provided and connected in the known manner to protect the power transistors from voltage induced in the stator windings when each is rendered non-conducting.

The drive and control circuit further comprises an integrated circuit (IC), indicated generally and schematically at 40. The IC 40 is of a type well-known to those skilled in the art and in the particular embodiment illustrated, the IC is an eight pin dual in line package (DIP) which includes two internal transistors 42, and 44, which in the present invention are used as switching transistors. Before turning to the switching transistors and their operation in more detail, the general and well known features of the IC will be briefly discussed.

The IC 40 provides a single-chip solution for the control of a single-phase, brushless DC motor. The IC includes a high sensitivity Hall effect sensor 46, control and commutating logic 48 and a low-level output 50 output at pin 50 of the IC which provides tachometer capability for motor speed control or for sensing a locked rotor condition via conducting path 51. By adding the appropriate external logic and components, pulse-width modulated speed control can be accomplished at the output current adjust pin 52. The IC further provides extensive protective features such as thermal shutdown, output over-current limiting and short circuit protection. IC's of the illustrated type are available from, for example, Allegro Micro Systems, Worcester, Mass.

Returning now to the switching transistors, the collector of the switching transistor 42 at an output current drive pin 60 of the IC 40 is connected to the emitter of power transistor 26. The collector of the switching transistor 44 at an output current drive pin 62 of the IC 40 is connected to the emitter of power transistor 28. The power supply, in addition to forward biasing the two power transistors 26 and 28, also provides the IC with an IC rated voltage at pin 64, which in the embodiment illustated is about 14 volts as determined by the zener diode 50. When the switching transistors 42 and 44 are alternately switched by means of a conventional Hall sensor and logic circuits included in the IC, a path to ground via the collector and the emitter of the switching transistors 42 or 44 is established so that current flows through a corresponding conductively biased power transistor 26 or 28 which in turn energizes an associated stator winding 12 or 14. Because the bias voltage to each of the power transistors 26 and 28 is at or below the IC rated voltage, the voltage potential at the emitter of the power transistors 26 and 28 and the corresponding current drive output pins 60 and 62 of the IC will be held at or below the IC rated voltage for safe operation. IC 40 can be used to drive and control a DC motor having a much higher operating voltage.

We claim:

1. A drive and control circuit for a brushless DC motor having at least one stator winding and a permanent magnet rotor, said drive and control circuit comprising:

at least one conductively biased power transistor having a collector to emitter current flow path connected in series to said at least one stator winding;

an integrated circuit (IC) having an IC maximum rated voltage which is less than the maximum net voltage of the drive and control circuit, said IC including at least one internal switching transistor, and a Hall sensor with control and commutation logic circuits, said at least one internal switching transistor having a collector to emitter current flow path connected in series at least one current drive output pin of the IC to said collector to emitter flow path of said at least one power transistor by means of connecting the collector of said at least one switching transistor to the emitter of said at least one of said power transistors;

a DC power supply for the drive and control circuit which forward and conductively biases said power transistors at or below said IC maximum rated voltage, and said DC power supply supplies the IC with a voltage potential at or below said maximum IC rated voltage;

wherein when the IC's said at least one internal switching transistor is switched on by means of said conventional Hall sensor with said control and commutation logic circuits included in the IC, a path to ground via the collector and the emitter of said at least one switching transistor is established so that current flows through said at least one conductively biased power transistor so that at least one stator winding is excited, the voltage potential at the emitter of said at least one power transistor and said at least one current drive output pin of the IC being held at or below the IC maximum rated voltage for safe operation since the bias voltage to said at least one power transistor is at or below the IC maximum rated voltage.

2. A drive and control circuit according to claim 1 wherein at least one zener diode maintains a supply voltage to the IC at or below the IC maximum rated voltage.

3. A drive and control circuit for a single phase, brushless DC motor having a pair of stator windings and a permanent magnet rotor, said drive and control circuit comprising:

a pair of conductively biased power transistors each having a collector to emitter current flow path connected in series through a respective collector to a different one of the DC motor's two stator windings;

an integrated circuit (IC) having an IC maximum rated voltage which is less than the maximum net voltage of the drive and control circuit, said IC including two internal switching transistors, and a conventional Hall sensor with control and commutation logic circuits, said internal switching transistors each having a collector to emitter current flow path connected in series at respective current drive output pins of the IC to a respectively different one of said collector to emitter flow paths of the external power transistors by means of respectively connecting the collectors of each of said switching transistors to the emitter of a different one of the external power transistors;

a DC power supply for the drive and control circuit which forward and conductively biases the power transistors at or below said IC maximum rated voltage, and said DC power supply supplies the IC with a voltage potential at or below said maximum IC rated voltage;

wherein when the IC's internal switching transistors are alternately and periodically switched on by means of a conventional Hall sensor with control and commutation logic circuits included in the IC, a path to ground via the collector and the emitter of the switching transistors is established so that current flows through a corresponding one of said conductively biased power transistors so that an associated stator winding is excited, the voltage potential at the emitter of the power transistors and the corresponding current drive output pins of the IC being held at or below the IC maximum rated voltage for safe operation since the bias voltage to each of the power transistors is at or below the IC rated voltage.

4. A drive and control circuit according to claim 3 wherein at least one zener diode maintains a supply voltage to the IC at or below the IC maximum rated voltage.

5. A drive and control circuit according to claim 3 wherein said power transistors are of the n-p-n type.

6. A drive and control circuit according to claim 3 further including high voltage protection circuitry for said power transistors.

7. A drive and control circuit according to claim 6 wherein said high voltage protection circuitry comprises a first diode, a second diode, and a zener diode; the anode of said first diode being connected between one of said power transistors and one end of said stator windings connected in series with one another, the anode of said second diode being connected between the other of said power transistors and one end of the other of said stator windings connected in series with one another, the cathodes of said first and second diodes being connected to one another and to the cathode of said zener diode, the anode of said zener diode being connected to the other ends of said stator windings.

* * * * *